(12) United States Patent
Botros et al.

(10) Patent No.: US 8,430,952 B2
(45) Date of Patent: Apr. 30, 2013

(54) WATER SOLUBLE BRANCHED POLYETHYLENEIMINE COMPOSITIONS

(75) Inventors: Raouf Botros, Centerville, OH (US); Tom N. Huang, Beavercreek, OH (US); Russell H. Tobias, Centerville, OH (US); Eric A. Fossum, Middletown, OH (US)

(73) Assignee: Eastman Kodak Company, Rochester, NY (US)

( * ) Notice: Subject to any disclaimer, the term of this patent is extended or adjusted under 35 U.S.C. 154(b) by 750 days.

(21) Appl. No.: 12/251,662

(22) Filed: Oct. 15, 2008

(65) Prior Publication Data

US 2009/0043040 A1 Feb. 12, 2009

Related U.S. Application Data

(63) Continuation-in-part of application No. 11/536,909, filed on Sep. 29, 2006.

(51) Int. Cl.
 *C09D 11/00* (2006.01)

(52) U.S. Cl.
 USPC ........................ 106/31.27; 523/160

(58) Field of Classification Search .......... None
See application file for complete search history.

(56) References Cited

U.S. PATENT DOCUMENTS

| | | | |
|---|---|---|---|
| 3,262,791 A * | 7/1966 | Dickson et al. | 106/14.16 |
| 4,197,135 A * | 4/1980 | Bailey et al. | 106/31.43 |
| 4,255,754 A | 3/1981 | Crean et al. | |
| 4,698,123 A | 10/1987 | Link et al. | |
| 4,751,517 A | 6/1988 | Crean et al. | |
| 4,789,400 A | 12/1988 | Solodar et al. | |
| 5,017,644 A | 5/1991 | Fuller et al. | |
| 5,223,028 A * | 6/1993 | Aulick et al. | 106/31.43 |
| 5,364,462 A | 11/1994 | Crystal et al. | |
| 5,425,805 A * | 6/1995 | Botros et al. | 106/31.43 |
| 5,730,789 A | 3/1998 | Botros | |
| 2001/0003731 A1 * | 6/2001 | Ochiai et al. | 503/227 |
| 2004/0035326 A1 | 2/2004 | Borzyk et al. | |
| 2004/0176499 A1 | 9/2004 | Herrmann et al. | |
| 2008/0045652 A1 * | 2/2008 | Snell et al. | 524/612 |
| 2008/0078304 A1 | 4/2008 | Botros et al. | |

FOREIGN PATENT DOCUMENTS

| | | |
|---|---|---|
| DE | 10026466 | 11/2001 |
| EP | 1454964 | 9/2004 |
| GB | 1277357 A * | 6/1972 |

OTHER PUBLICATIONS

Jian Lin, Shuyi Qiu, Kim Lewis, and Alexander M. Klibanov, "Bactericidal Properties of Flat Surfaces and Nanoparticles Derivatized with Alkylated Polyethylenimines", Biotechnol. Prog. 2002, 18(5), 1082-1086.*

Sigma-Aldrich website catalog entry for polyethyleneimine, Accessed Mar. 4, 2010.*

* cited by examiner

*Primary Examiner* — Richard A Huhn
(74) *Attorney, Agent, or Firm* — Andrew J. Anderson

(57) ABSTRACT

A composition for coating or printing on a substrate, comprising a liquid vehicle and a water soluble branched polyethyleneimine comprising amino groups which have been alkylated or hydroxyalkylated, wherein the branched polyethyleneimine prior to alkylation or hydroxyalkylation comprises a combination of primary, secondary, and tertiary amino groups, and wherein at least 1% of the primary amino groups of the polyethyleneimine polymer are alkylated or hydroxyalkylated with at least one alkyl or hydroxyalkyl group having at least 4 carbon atoms.

17 Claims, No Drawings

WATER SOLUBLE BRANCHED POLYETHYLENEIMINE COMPOSITIONS

CROSS REFERENCE TO RELATED APPLICATIONS

This application is a continuation-in-part of commonly assigned U.S. patent application Ser. No. 11/536,909, filed Sep. 29, 2006, entitled "Water Soluble Branched Polyethyleneimine Compositions" in the name of Raouf Botros, et al., the disclosure of which is incorporated herein by reference.

FIELD OF THE INVENTION

The present invention refers to the area of inkjet printing, and more particularly to compositions for coating or printing on a substrate, comprising a liquid vehicle and a water soluble branched polyethyleneimine comprising amino groups which have been alkylated or hydroxylated. In a specific embodiment, the invention relates to a waterfast, dye-based ink suitable for inkjet printing (such as continuous inkjet) with improved optical density.

BACKGROUND OF THE INVENTION

In continuous ink jet (CIJ) printing, the ink is supplied under pressure to a manifold region that distributes the ink to a plurality of orifices, typically arranged in a linear array(s). The ink discharges from the orifices in filaments which break into droplet streams. The approach for printing with these droplet streams is to selectively charge and deflect certain drops from their normal trajectories. Graphic reproduction is accomplished by selectively charging and deflecting drops from the drop streams and depositing at least some of the drops on a print receiving medium while other drops strike a drop catcher device. The continuous stream ink jet printing process is described, for example, in U.S. Pat. Nos. 4,255,754, 4,698,123, and 4,751,517, the disclosures of each of which are totally incorporated herein by reference.

Generally, an ink for use in a CU system is required to have high waterfastness (reduced tendency to wick or bleed on a substrate when subjected to moisture) with excellent optical density and color tone, and yet be sufficiently fluid as to allow jetting through the nozzle. In the ink jet printing art, inks containing the water soluble dyes typically employed have the desired viscosity for runnability but are not considered to have a high degree of waterfastness. Typically, the solubility of the dye and the degree of ink waterfastness are inversely related. Polymers and resins may be added to the ink solution to enhance adhesion to the substrate and increase waterfastness. However, these polymers and resins also have the adverse affect of creating deposits on the printhead orifice and charge plates, adversely affecting machine runnability by increasing viscosity, and sufficiently high levels may have limited solubility.

Increasing the dye concentration in the ink in order to improve the optical density is limited by the solubility of the dye. If the solubility limit of the dye is exceeded the dye tends to crystallize out onto the orifice plate, causing crooked jets and poor runnability. Furthermore, the optical density of colors in general tends to level off at certain concentrations and adding more dye will have no effect on improving the optical density.

Polyethyleneimine (PEI) is often employed in ink compositions to increase waterfastness; however, PEI may decrease the solubility of the dye or worse, degrade the dye (reduction of the azo-linkage, which is the chemical group responsible for the color of the ink by the primary amino-group functional groups of PEI). Alkylation or hydroxyalkylation of the primary amino-group of branched polyethyleneimine has been suggested to decrease the ability of PEI to reduce the azo-linkage and preserve the dye. Unfortunately, as the percentage of alkylated/hydroxyalkylated primary and secondary amino-groups increase, the polymer becomes less soluble in water and precipitates out.

U.S. Pat. No. 5,017,644 discloses ink jet ink compositions which contain linear N-hydroxyethyl substituted polyethyleneimine polymers, and teaches using branched polymers gives results which are inferior in terms of waterfastness and lightfastness to those using linear polymers. Unfortunately, linear polymers are not commercially available, since the normal polymerization product of ethyleneimine has random side branches, which upon ethoxylation gives branched N-hydroxyethyl polyethyleneimine.

It is seen that there is still a need for improved compositions for coating or printing on a substrate, which would enable improved waterfast dye images printed with ink jet recording equipment.

SUMMARY OF THE INVENTION

In one embodiment, the invention is directed towards a composition for coating or printing on a substrate, comprising a liquid vehicle and a water soluble branched polyethyleneimine comprising amino groups which have been alkylated or hydroxyalkylated, wherein the branched polyethyleneimine prior to alkylation or hydroxyalkylation comprises a combination of primary, secondary, and tertiary amino groups, and wherein at least 1% of the primary amino groups of the branched polyethyleneimine polymer are alkylated or hydroxyalkylated with at least one alkyl or hydroxyalkyl group having at least 4 carbon atoms.

In a specific embodiment, the invention is directed towards such a composition further comprising an anionic dye soluble in the liquid vehicle, which composition provides a waterfast, dye-based ink that is suitable for inkjet printing, and particularly for continuous inkjet printing. In a further aspect of such embodiment, a dimethylaminoethanol ("DMAE") base is included in an amount sufficient to provide a pH of above 10 and discourage electrostatic interactions between the polyethyleneimine and the dye.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

The composition of the present invention comprises a liquid vehicle and a water soluble alkylated or hydroxyalkylated branched polyethyleneimine. Prior to alkylation or hydroxyalkylation, branched polyethyleneimines comprise a combination of primary, secondary, and tertiary amino groups, typically in a molar ratio of approximately 1:2:1. In accordance with the invention, at least 1% of the primary amino groups of the branched polyethyleneimine polymer are alkylated or hydroxyalkylated with at least one alkyl or hydroxyalkyl group having at least 4 carbon atoms, preferably 4-12 carbon atoms, and most preferably, 4-6 carbon atoms. In a preferred embodiment, at least 3 mole percent of the substitutable hydrogens of the primary and secondary amino groups of the branched polyethyleneimine are alkylated or hydroxyalkylated with alkyl or hydroxyalkyl groups having at least 4 carbon atoms, preferably 4-12 carbon atoms, and most preferably, 4-6 carbon atoms. Specific examples of such compounds include hydroxybutylated PEI, and hexylated PEI.

When employing alkyl groups having at least 4 carbon atoms, to maintain adequate solubility it is preferred that only 1-10 mole percent of the substitutable hydrogens of the amino groups of the branched polyethyleneimine are alkylated with such alkyl groups. In such case, in a further preferred embodiment at least 5 percent of the remaining substitutable hydrogens of the amino groups of the branched polyethyleneimine may be hydroxyalkylated with hydroxyalkyl groups having 1-3 carbon atoms. In a specific preferred embodiment 1-10 mole percent of the substitutable hydrogens of the amino groups of the branched polyethyleneimine may be alkylated with pentyl or hexyl groups and any amino groups of the branched polyethyleneimine having remaining substitutable hydrogens may be fully hydroxyethylated.

When employing hydroxyalkyl groups having at least 4 carbon atoms, they may be employed at any mole percent of the hydroxyalkyl groups having at least 4 carbon atoms wherein the water solubility is maintained. In a specific embodiment, the amino groups of the branched polyethyleneimine having substitutable hydrogens may be fully hydroxybutylated. In an alternative embodiment, hydroxyalkyl groups having at least 4 carbon atoms may be employed to hydroxyalkylate a first portion of the amino groups of the branched polyethyleneimine having substitutable hydrogens, and hydroxyalkyl groups having 1-3 carbon atoms may be employed to hydroxyalkylate a second portion of the amino groups of the branched polyethyleneimine, up to a fully alkoxylated position.

Alkylated, hydroxyalkylated, and alkylated/hydroxyalkylated branched polyethyleneimine polymers employed in the present invention may be prepared by alkylated and/or hydroxyalkylating commercially available branched PEI polymers employing conventional alkylation and hydroxyalkylation chemistry.

When employed with anionic water soluble dyes, such specific branched polyethyleneimine polymers comprising such alkyl and hydroxyalkyl substituents with at least 4 carbon atoms have been found to surprisingly result in increased optical density, as well as providing additionally desired attributes of improved waterfastness. By limiting the length of the alkyl groups, and or the amount of substitution with such specific substituents, the solubility of the PEI derivatives may be controlled so as also not to be substantially detrimentally altered as compared to the unsubstituted derivatives.

Branched polyethyleneimine polymers employed in accordance with the invention typically will have a molecular weight range of approximately 10,000 to 60,000, although lower or higher molecular weight polymers may also be useful. For example, the invention has been achieved using a polymer with a molecular weight of 750,000.

By incorporating an anionic dye soluble in the liquid vehicle, compositions in accordance with the invention may provide waterfast, dye-based ink that is suitable for inkjet printing. The use of a dye-based ink is preferable in compositions of the invention, as the viscosity of the solutions allows for runnability in a CIJ printing system. The dye in the ink jet ink composition of such embodiment of the present invention is water soluble and preferably selected from the group consisting of Direct Dyes, Acid Dyes, and Food Dyes. For ink jet ink compositions, the water soluble branched polyethyleneimine polymer is preferably present in an amount of from about 0.5 to 5.0% by dry weight basis, and the anionic dye is preferably present in an amount of from about 1.0 to 5.0% by dry weight basis, more preferably between about 2% and 4% by weight.

While the compositions of the invention may include a dye to form an ink composition, compositions in accordance with the invention without dye incorporate therein are also useful, and may be employed, e.g., to be coated or printed on a substrate either before or after printing of a dye composition in order to improve the properties of the printed dye. In accordance with a further embodiment, the present invention is accordingly also directed towards a medium for printing an ink jet image on, comprising a substrate and a surface layer comprising an alkylated or hydroxyalkylated branched polyethyleneimine coated from a composition in accordance with the present invention.

It is understood and known in the art that waterfastness is substrate dependent. The composition of the present invention is particularly adaptable for incorporation into an ink jet printing apparatus for forming images by causing the ink to be expelled as droplets onto a substrate, thereby generating an image on a wide variety of substrates. Additionally, the present invention allows for the addition of other chemicals necessary for particular substrates. For example, when necessitated, a surfactant may be added when high gloss substrates are used.

It will be appreciated that while inclusion of a PEI polymer increases waterfastness, there may also be premature interaction between the anionic dye and the cationic PEI while within the drop generator. Thus, it is preferred to prevent this interaction until it becomes desirable. In a further embodiment of the invention, a dimethylaminoethanol ("DMAE") base may be included in an amount sufficient to provide a pH of above 10 to reduce the cationic charge on the polymer to a minimum and discourage electrostatic interactions between the polyethyleneimine and the dye. After jetting, the DMAE evaporates, reducing the pH and allowing the PEI and dye to interact and create a waterfast ink.

In some systems, it may be anticipated that other chemicals may be required for proper application of the present ink formulation. For example, defoamers, biocides to reduce bacterial growth, anticorrosion to protect hardware, surfactants which are dependent upon the desired substrate, alcohols, and buffers, aid in the specialization of the ink formulation for particular usages. In particular embodiments, other additives that may optionally be included in the compositions of the invention include a corrosion inhibitor in an amount from 0 to 0.2 wt. % such as an alkanolamino-group; a wetting agent of from 0 to 1 wt. %, such as an ethoxylated glycol ether; a lower alphatic alcohol having one hydroxy group and up to five carbon atoms in a straight or branched chain in an amount of 0 to 10 wt. %; and a biocide from 0 to 0.5 wt. % such as dehydroacetic acid. The compositions may also include an optional defoamer such as phosphate esters, silicone or non-silicone defoamer or acetylenic diol.

The following synthesis examples are provided as representative of techniques for preparation of alkylated, hydroxyalkylated, and alkylated/hydroxyalkylated branched polyethyleneimine polymers that may be employed in the present invention. As indicated above, such polymers may be prepared by alkylating and/or hydroxyalkylating commercially available branched PEI polymers employing conventional alkylation and hydroxyalkylation chemistry.

Synthesis of 7% Hexylated Polyethyleneimine:

18 g of branched polyethyleneimine (PEI) was dissolved in 180 ml of THF. 4.11 ml of hexylbromide was added to the solution, and the reaction refluxed for 48 hours at 75-85 C. After 48 hours, 1.16 g of NaOH was dissolved in MeOH and the solution was added to the reaction as it continued to reflux for 24 hours. Once completed, the reaction was allowed to settle for 24 hours, filtered, and solvent was removed on a rotary evaporator. The resulting yellow sample was dried under vacuum, resulting in 7% hexylated branched polyethyleneimine (7% HPEI).

Synthesis of 7% Hexylated/23% Hydroxypropylated Polyethyleneimine:

15 g of 7% hexylated branched polyethyleneimine (7% HPEI) was dissolved in 125 ml of ethanol. 25 ml of rinse, alongside the solution and a bomb container, were allowed to sparge with $N_2$ for 12-15 min. Each was added to the bomb along with 4.09 ml of propylene oxide. The reaction was heated to 60 C (5-7 hours) and then allowed to cool overnight. Once removed from the bomb, the reaction was evaporated for 24 hours and was dissolved in $H_2O$ and transferred to 8 k MWCO dialysis tubing for 48 hours. The sample was then dried down to a desired percentage of solid in solution for delivery.

Synthesis of 7% Hexylated/43% Hydroxypropylated Polyethyleneimine:

15 g of 7% hexylated branched polyethyleneimine (7% HPEI) was dissolved in 125 ml of ethanol. 25 ml of rinse, alongside the solution and a bomb container, were allowed to sparge with $N_2$ for 12-15 min. Each was added to the bomb along with 7.66 ml of propylene oxide. The reaction was heated to 60 C (5-7 hours) and then allowed to cool overnight. Once removed from the bomb, the reaction was evaporated for 24 hours and was dissolved in $H_2O$ and transferred to 8 k MWCO dialysis tubing for 48 hours. The sample was then dried down to a desired percentage of solid in solution for delivery.

An ink made in accordance with an embodiment of the present invention may be manufactured as follows:

Ink Preparations

The following preparations provide a comparison of use of alkylated and hydroxyalkylated branched polyethyleneimines in accordance with the invention with a currently used ink formulation, such as the Kodak FD 1096 black ink. Alkylation or hydroxyalkylation in accordance with the current invention provides the benefit of substituted primary and secondary amino-groups without losing substantial solubility, while also providing greater optical density. In each example, the category of "Other" designates conventional biocide, alcohol, glycol, or other additive. In Examples 1-3, the branched PEI employed in each case was fully hydroxyalkylated.

DYE DB-19

| Component | Weight % |
|---|---|
| Example 1 | |
| Hydroxyethylated PEI (36 wt % solution) | 5.58 |
| DMAE | 2.40 |
| Dye (DB-19) (19% Solution) | 20.80 |
| Surfactant | 0.30 |
| Defoamer | 0.01 |
| Other | 2.40 |
| Water | 68.51 |
| Example 2 | |
| Hydroxypropylated PEI (36 wt % solution) | 5.58 |
| DMAE | 2.40 |
| Dye (DB-19) (19% Solution) | 20.80 |
| Surfactant | 0.30 |
| Defoamer | 0.01 |
| Other | 2.40 |
| Water | 68.51 |
| Example 3 | |
| Hydroxybutylated PEI (36 wt % solution) | 5.58 |
| DMAE | 2.40 |
| Dye (DB-19) (19% Solution) | 20.80 |
| Surfactant | 0.30 |
| Defoamer | 0.01 |
| Other | 2.40 |
| Water | 68.51 |

To determine the effectiveness of each solution in each example above, the solutions were applied onto a varied of substrates with a #6 drawn down rod, including Laser MOCR Bond, Sterling Ultra Gloss, Smart Paper Kromekote, IP Carolina Cover C1S, and UPM Digibright/Brite 72. The inked substrates were then evaluated for waterfastness and print intensity. While repeat measurements were taken at 0, 24, and 48 hours, only the initial evaluation results are shown below, as one skilled in the art will appreciate that waterfastness and optical density improve with drying time. The results are summarized in Table I below, wherein optical density/waterfastness results are provided for each substrate:

TABLE I

| Substrate | Hydroxyethylated PEI | Hydroxypropylated PEI | Hydroxybutylated PEI |
|---|---|---|---|
| Laser MOCR bond | 0.95/95% | 0.93/98% | 0.94/99% |
| Sterling Ultra Gloss | 1.26/74% | 1.34/78% | 1.43/96% |
| Smart Papers Kromekote | 1.14/93% | 1.24/97% | 1.47/100% |
| Carolina Cover C1S | 1.25/93% | 1.32/94% | 1.49/98% |
| UPM Digibright/ Brite 72 | 0.94/96% | 0.94/96% | 0.95/99% |

As can be determined from the results above, the optical density and waterfastness remain highly dependent upon the selected substrate. The four-carbon hydroxyalkyl-derivative, however, showed the overall best optical density and waterfastness by a significant margin, especially on the coated substrates.

Alkylated PEI derivatives were also prepared with varying degrees of amino-group substitution. For the following examples, 3, 5, and 7% hexylated polyethyleneimine were used. In each example, the PEI solid was added in an amount equal to 2% by weight.

| Component | Weight % |
|---|---|
| Example 4 | |
| 3% Hexylated PEI (36 wt % solution) | 5.58 |
| DMAE | 2.40 |
| Dye (DB-19) (19% Solution) | 20.80 |
| Surfactant | 0.30 |
| Defoamer | 0.01 |
| Other | 2.40 |
| Water | 68.51 |
| Example 5 | |
| 5% Hexylated PEI (36 wt % solution) | 5.58 |
| DMAE | 2.40 |
| Dye (DB-19) (19% Solution) | 20.80 |
| Surfactant | 0.30 |
| Defoamer | 0.01 |
| Other | 2.40 |
| Water | 68.51 |
| Example 6 | |
| 7% Hexylated PEI (36 wt % solution) | 5.58 |
| DMAE | 2.40 |
| Dye (DB-19) (19% Solution) | 20.80 |
| Surfactant | 0.30 |
| Defoamer | 0.01 |
| Other | 2.40 |
| Water | 68.51 |

Example solutions were treated similar to manner described above, and the optical density/waterfastness results are provided in Table II:

TABLE II

| Substrate | Hydroxyethylated PEI | 3% Hexylated PEI | 5% Hexylated PEI | 7% Hexylated PEI |
|---|---|---|---|---|
| Laser MOCR bond | 0.93/97% | 0.94/99% | 0.93/101% | 0.95/100% |
| Sterling Ultra Gloss | 1.2/79% | 1.28/86% | 1.3/92% | 1.33/94% |
| Smart Papers Kromekote | 1.0/86% | 1.36/103% | 1.42/103% | 1.47/104% |
| Carolina Cover C1S | 1.22/91% | 1.43/100% | 1.42/99% | 1.48/99% |
| UPM Digibright/Brite 72 | 0.92/98% | 0.94/101% | 0.95/102% | 0.97/101% |

Optical density and waterfastness for the hexylated PEI were drastically increased as compared to the standard hydroxyethylated PEI derivative traditionally used in inks. While the percentage of alkylation of the amino-groups made slight differences in the observed values on some substrates, generally, there was a significant increase in the observed values on the coated substrates with increased alkylation.

Partially alkylated and partially hydroxyalkylated PEI derivatives were also prepared with varying degrees of amino-group substitution. For the following examples, 7% hexylated and either 23% or 43% hydroxypropylated polyethyleneimine were used.

| Component | Weight % |
|---|---|
| Example 7 | |
| 7% Hexylated, 23% Hydroxypropylated PEI (10 wt % solution) | 20.00 |
| DMAE | 2.40 |
| Dye (DB-19) (19% Solution) | 20.80 |
| Surfactant | 0.30 |
| Defoamer | 0.01 |
| Water | 56.49 |
| Example 8 | |
| 7% Hexylated, 43% Hydroxypropylated PEI (10 wt % solution) | 20.00 |
| DMAE | 2.40 |
| Dye (DB-19) (19% Solution) | 20.80 |
| Surfactant | 0.30 |
| Defoamer | 0.01 |
| Water | 56.49 |

Example solutions were treated similar to manner described above, and the average optical density/waterfastness results for coated substrates and uncoated substrates are reported in Table III below:

TABLE III

| Substrate | 7% Hexylated, 23% Hydroxypropylated PEI | 7% Hexylated, 43% Hydroxypropylated PEI |
|---|---|---|
| coated | 1.61/99% | 1.50/97% |
| uncoated | 0.96/100% | 0.97/100% |

Optical density and waterfastness for the hexylated/hydroxypropylated PEI were drastically increased as compared to results previously reported for the standard hydroxyethylated PEI derivative traditionally used in inks, and even further improved relative to the results for the individually hexylated or hydroxypropylated PEI examples previously reported.

Further examples including partially alkylated and partially hydroxyalkylated PEI derivatives were prepared with varying degrees of amino-group substitution. For the following examples, the percentages of alkylation and hydroxyalkylation were varied.

| Component | Weight % |
|---|---|
| Example 9 | |
| 7% Pentylated, 68% Hydroxypropylated PEI (3.2 wt % solution) | 62.50 |
| DMAE | 2.40 |
| Dye (DB-19) (19% Solution) | 20.80 |
| Surfactant | 0.30 |

-continued

| Component | Weight % |
|---|---|
| Defoamer | 0.01 |
| Water | 13.99 |
| Example 10 | |
| 3% Decylated, 69% Hydroxypropylated PEI (6.8 wt % solution) | 29.40 |
| DMAE | 2.40 |
| Dye (DB-19) (19% Solution) | 20.80 |
| Surfactant | 0.30 |
| Defoamer | 0.01 |
| Other | 2.40 |
| Water | 44.69 |
| Example 11 | |
| 5% Dodecylated, 75% Hydroxypropylated PEI (11.84 wt % solution) | 16.90 |
| DMAE | 2.40 |
| Dye (DB-19) (19% Solution) | 20.80 |
| Surfactant | 0.30 |
| Defoamer | 0.01 |
| Other | 2.40 |
| Water | 57.19 |

Example solutions were treated similar to the manner described above, and the optical density/waterfastness results are provided in Table IV:

TABLE IV

| Substrate | Hydroxyethylated PEI | 7% Pentylated, 68% Hydroxypropylated PEI | 3% Decylated, 69% Hydroxypropylated PEI | 5% Dodecylated, 75% Hydroxypropylated PEI |
|---|---|---|---|---|
| Carolina Cover C1S | 1.03/87% | 1.37/98% | 1.43/94% | 1.34/89% |
| Laser MOCR bond | 0.93/92% | 0.94/95% | 0.92/98% | 0.86/96% |
| Sterling Ultra Gloss | 0.86/78% | 1.16/95% | 1.3/92% | 1.1/93% |

Optical density and waterfastness for the pentylated/hydroxypropylated PEI, decylated/hydroxypropylated PEI, and dodecylated/hydroxypropylated PEI were drastically increased as compared to results reported for the standard hydroxyethylated PEI derivative traditionally used in inks.

INDUSTRIAL APPLICABILITY AND ADVANTAGES

The present invention is useful in the field of ink jet printing, and has the advantage of formulating a modified composition for coating or printing for use in ink jet printing which has increased composition solubility and increased printed ink waterfastness.

The invention has been described in detail with particular reference to certain preferred embodiments thereof, but it will be understood that variations and modifications can be effected within the spirit and scope of the invention.

The invention claimed is:

1. A dye-based inkjet ink composition for printing on a substrate, comprising a liquid vehicle, an anionic dye soluble in the liquid vehicle, and a water soluble branched polyethyleneimine comprising amino groups which have been alkylated, wherein the branched polyethyleneimine prior to alkylation comprises a combination of primary, secondary, and tertiary amino groups, and wherein at least 1% of the primary amino groups of the branched polyethyleneimine polymer are alkylated with at least one alkyl group having at least 4 carbon atoms, and wherein 1-10 mole percent of the substitutable hydrogens of the amino groups of the branched polyethyleneimine are alkylated with an alkyl group having at least 4 carbon atoms.

2. A composition according to claim 1 wherein at least 3 mole percent of the substitutable hydrogens of the primary and secondary amino groups of the branched polyethyleneimine are alkylated with alkyl groups having at least 4 carbon atoms.

3. A composition according to claim 1, wherein at least 5 percent of the substitutable hydrogens of the amino groups of the branched polyethyleneimine are hydroxyalkylated with hydroxyalkyl groups having 1-3 carbon atoms.

4. A composition according to claim 3 wherein 1-10 mole percent of the substitutable hydrogens of the amino groups of the branched polyethyleneimine are alkylated with an alkyl group having 4-12 carbon atoms.

5. A composition according to claim 4 wherein 1-10 mole percent of the substitutable hydrogens of the amino groups of the branched polyethyleneimine are alkylated with an alkyl group having 4-6 carbon atoms.

6. A composition according to claim 1, wherein at least 1% of the primary amino groups of the branched polyethyleneimine polymer are alkylated with at least one alkyl group having 4-12 carbon atoms.

7. A composition according to claim 1, wherein at least 1% of the primary amino groups of the branched polyethyleneimine polymer are alkylated with at least one alkyl group having 4-6 carbon atoms.

8. A composition according to claim 1, further comprising a dimethylaminoethanol base in an amount sufficient to provide a pH of above 10 and discourage electrostatic interactions between the polyethyleneimine and the dye.

9. A composition according to claim 8, wherein the water soluble branched polyethyleneimine polymer is present in an amount of from about 0.5 to 5.0% by weight, and the anionic dye is present in an amount of from about 1.0 to 5.0% by weight.

10. A composition according to claim 9, wherein at least 3 mole percent of the substitutable hydrogens of the primary and secondary amino groups of the branched polyethyleneimine are alkylated with alkyl groups having at least 4 carbon atoms.

11. A composition according to claim 9, wherein at least 5 percent of the substitutable hydrogens of the amino groups of the branched polyethyleneimine are hydroxyalkylated with hydroxyalkyl groups having 1-3 carbon atoms.

12. A composition according to claim 11 wherein 1-10 mole percent of the substitutable hydrogens of the amino groups of the branched polyethyleneimine are alkylated with an alkyl group having 4-12 carbon atoms.

13. A composition according to claim 12 wherein 1-10 mole percent of the substitutable hydrogens of the amino groups of the branched polyethyleneimine are alkylated with an alkyl group having 4-6 carbon atoms.

14. A composition according to claim 9, wherein at least 1% of the primary amino groups of the branched polyethyleneimine polymer are alkylated with at least one alkyl group having 4-12 carbon atoms.

15. A composition according to claim 9, wherein at least 1% of the primary amino groups of the branched polyethyleneimine polymer are alkylated with at least one alkyl group having 4-6 carbon atoms.

16. A composition according to claim 1, wherein the branched polyethyleneimine has a molecular weight of at least approximately 10,000.

17. A composition according to claim 1, wherein the branched polyethyleneimine has a molecular weight of approximately 10,000 to 60,000.

* * * * *